United States Patent [19]

Waddington

[11] 4,313,144
[45] Jan. 26, 1982

[54] TAPE CASSETTE HAVING INTERNAL DRIVE WITH SPEED ADJUSTMENT

[76] Inventor: Anthony B. Waddington, 20 Bartok House, 30 Lansdowne Walk, London, W.11, England

[21] Appl. No.: 94,687

[22] Filed: Nov. 15, 1979

[30] Foreign Application Priority Data

Nov. 16, 1978 [GB] United Kingdom ............ 44864/78
Jul. 12, 1979 [GB] United Kingdom ......... 7924412/79

[51] Int. Cl.³ .................. G11B 15/28; G11B 15/44; G11B 23/04
[52] U.S. Cl. .................................. 360/132; 242/199; 360/73; 360/96.3
[58] Field of Search ............... 360/132, 73, 96.1, 96.3, 360/96.4, 71; 242/196-200, 206, 209, 55.19 R, 15.19 A; 226/178, 175

[56] References Cited

U.S. PATENT DOCUMENTS

| | | | |
|---|---|---|---|
| 2,844,369 | 7/1958 | Singer | 242/55.19 A |
| 3,507,435 | 4/1970 | Hathaway | 360/73 |
| 3,511,449 | 5/1970 | Mathus et al. | 242/55.19 A |
| 3,620,467 | 11/1971 | Isom | 242/55.19 A |
| 3,708,135 | 1/1973 | Lace | 360/73 |
| 3,791,600 | 2/1974 | Tsukhgoshi | 242/55.19 A |
| 3,862,729 | 1/1975 | Staar | 242/206 |
| 4,138,700 | 2/1979 | Russell | 360/93 |
| 4,170,029 | 10/1979 | Kahn | 360/73 |

*Primary Examiner*—ALfred H. Eddleman
*Attorney, Agent, or Firm*—Charles E. Brown

[57] ABSTRACT

A tape cassette includes an internal drive system which is engageable by a drive capstan of a tape cassette machine and which drives a recording tape of the cassette at a speed which is higher or lower than the speed at which the tape would be driven by the capstan alone. Where the tape speed is reduced, the playing time of the cassette is increased and the cassette is therefore less wasteful for speech recordings where a high tape speed is not necessary. The drive system can comprise a drive belt which is driven by the capstan and which passes around a pair of rollers, the tape being driven by means of one of the rollers. Alternatively, a rotatable member (such as a roller, a tubular sleeve or a gear) can be engaged by the capstan, and the tape is then driven by means of the rotatable member.

25 Claims, 21 Drawing Figures

TAPE CASSETTE HAVING INTERNAL DRIVE WITH SPEED ADJUSTMENT

The present invention relates to tape cassettes.

Tape cassette players are designed primarily for driving tapes on which music is recorded and therefore in order to obtain reasonable quality reproduction from such cassette the tape must be recorded and played at a reasonably fast speed. Such quality reproduction, however, is not required where the material recorded does not have a musical content, for example, recordings of stories. Running the tape cassettes at the higher speeds required for musical reproduction is therefore very wasteful of tape.

Accordingly the present invention provides a tape cassette having an internal drive system for adjusting the tape transport speed to a value higher or lower than that provided by the drive system of a tape cassette machine.

The present invention is further described hereinafter, by way of example, with reference to the accompanying drawings, in which.

Figure 1:
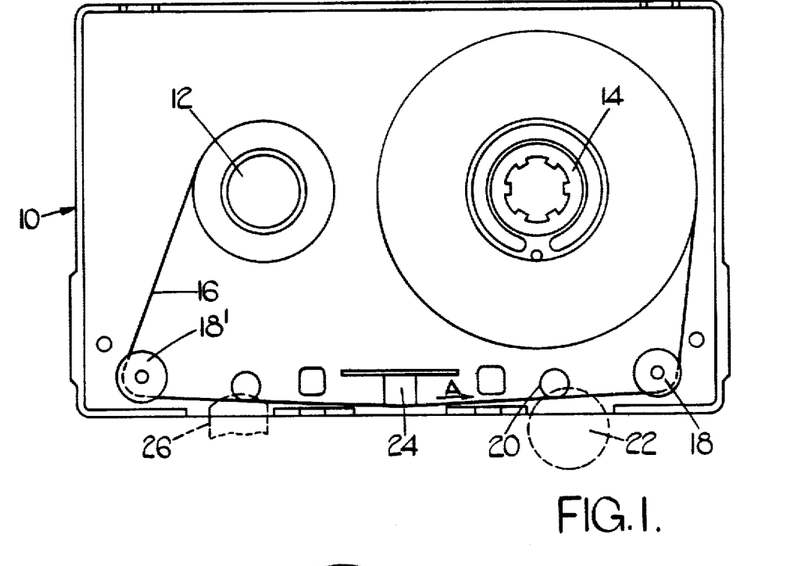
FIG. 1 is a schematic plan view of a conventional tape cassette with the top removed.

The conventional tape cassette 10 illustrated in FIG. 1 comprises two tape spools 12 and 14 over which a recording tape 16 is wound, the tape running from one spool 12 over an idler roller 18' past an erase head 26 of a cassette player, over a pressure pad 24 which serves to hold the tape against a record/play-back head (not shown) of the player, past a capstan 20 and a pressure roller 22 of the cassette player between which the tape is pinched, and around a further idler roller 18 to the other tape spool 14. In the drawings, the tape is normally driven in the direction of the arrow A, drive being applied to the tape via the capstan 20 of the cassette player.

Figure 2:
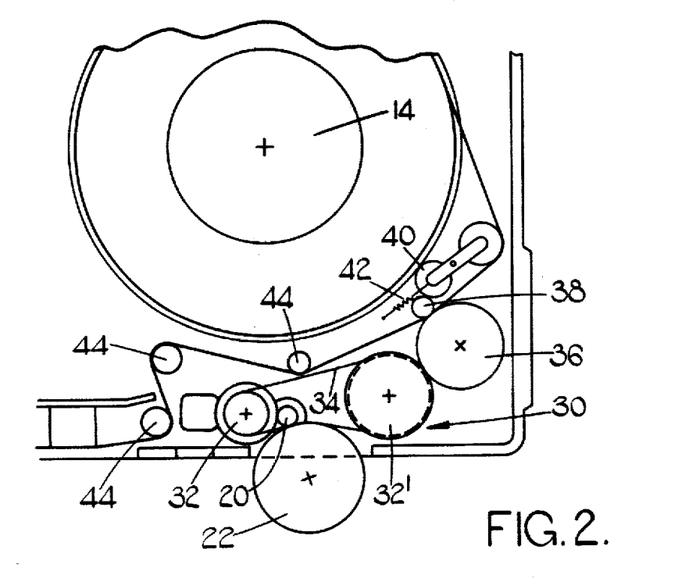
FIGS. 2 to 5 are schematic plan views of four embodiments of a tape cassette according to the present invention in which the tape transport speed is less than that in a conventional tape cassette.

FIG. 2 shows a first embodiment of a tape cassette according to the present invention in which a drive system 30 transports the tape at a slower speed than in a conventional cassette when the cassette is used in a conventional cassette recorder/player. Although the drive system is illustrated on the right-hand side of the cassette, it is to be understood that in this embodiment (and indeed in all of the embodiments described below) an identical drive system is also provided on the left-hand side of the cassette for use when the cassette is inverted. The drive system 30 comprises two idler rollers 32 and 32' of unequal diameter about which a drive band 34 is wound. The drive band is located such that when the cassette is inserted in the cassette player the drive band 34 is gripped between the capstan 20 and pressure roller 22 of the cassette player and is driven directly thereby. The larger of the two idler rollers 32' drives a further roller 36, of similar diameter which in turn drives a roller 38 of smaller diameter, the tape passing between these last two rollers. Drive is transmitted from the roller 38 to the spool 14 rim via a slipping clutch 40 which is maintained in engagement with the spool and the roller 38 by a spring 42, the normal hub drive of the spool from the cassette player being disconnected, as will be described in detail later. As illustrated, the idler roller 32 has an annular peripheral groove in which the drive band 34 is received, and the depth of this groove determines the transport speed of the tape, which is typically approximately one quarter of the standard speed. Illustrated at 44 are idler rollers and jockey pulleys which guide and lightly tension the tape.

Figure 3:
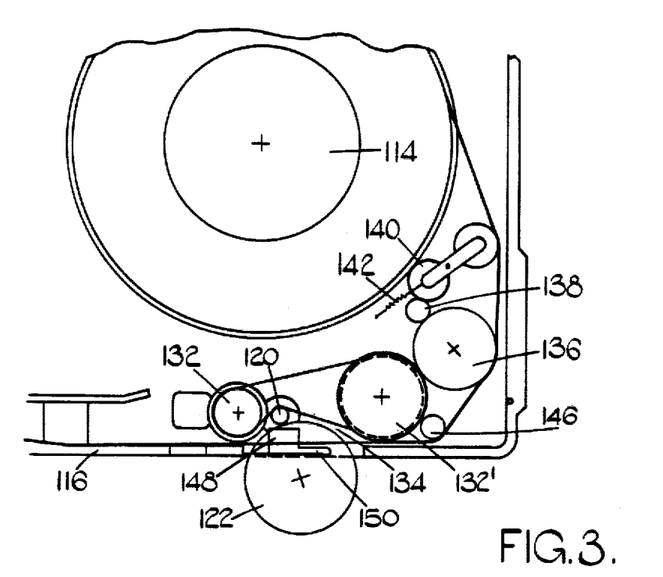

FIG. 3 shows a second embodiment of a tape cassette according to the present invention which is generally similar to the arrangement shown in FIG. 2, similar parts being denoted by the same reference numerals but with 100 added. In the embodiment of FIG. 3, however, the drive band 134 passes behind the capstan 130 and is, therefore, moved in the opposite direction to FIG. 2. To allow for this, the tape 116 passes around the outside of the roller 136, around a further idler roller 146, and around the idler roller 132. The pressure roller 122 of the cassette player is prevented from contacting the tape by a plate 148 which is suitably pivoted about an axis 150 to allow the erase head to come into contact with the tape when required.

Figure 4:
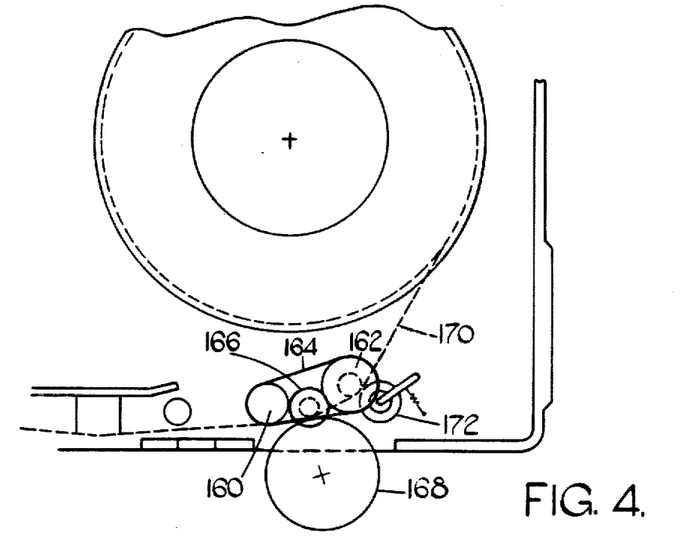

FIG. 4 shows a third embodiment of a tape cassette according to the present invention, in which the tape drive system again comprises a pair of idler rollers 160 and 162 around which a drive band 164 passes, the drive band being received in use between the capstan (referenced 166) and the pressure roller (referenced 168) of a cassette player. The recording tape (shown in broken line at 170) also passes between the capstan 166 and the pressure roller 168, but the drive band 164 being of greater thickness than the recording tape, provides sufficient clearance for the recording tape not to be contacted by the capstan or the pressure roller. In addition, the recording tape 170 passes around a reduced diameter portion of the idler roller 162 and is pressed between this portion and a pinch wheel 172.

Figure 5:
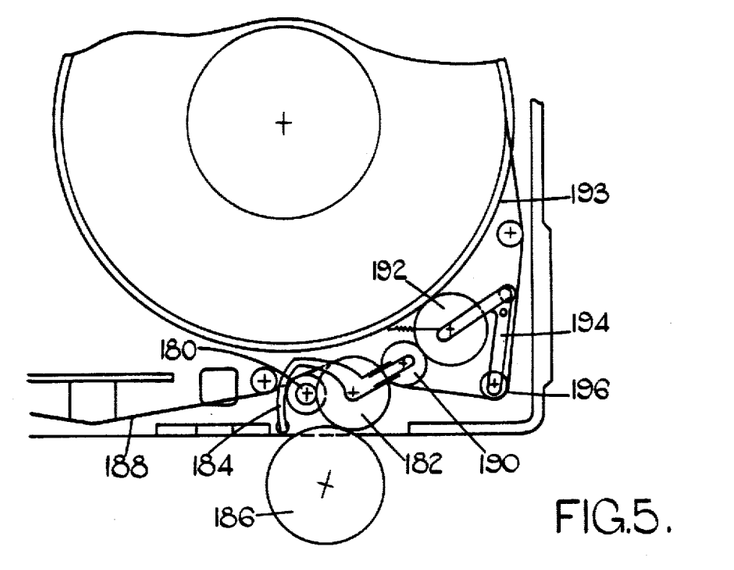
Figure 6:
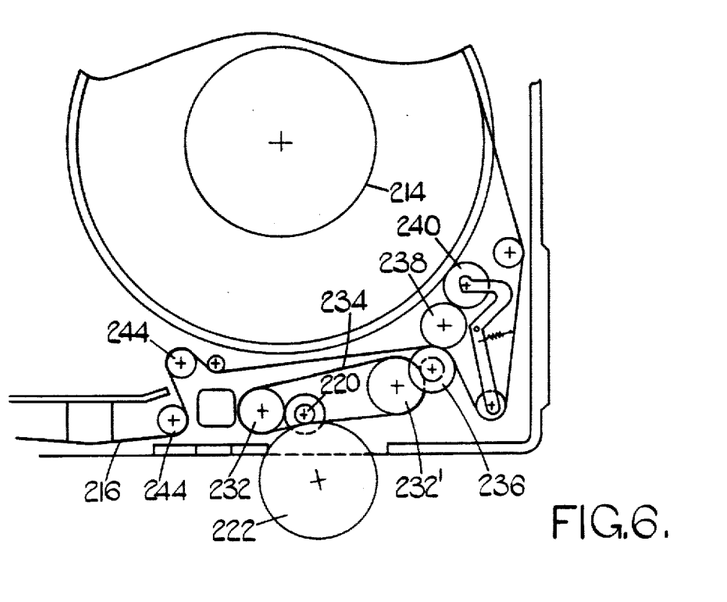
FIGS. 6 to 8 are schematic plan views of three embodiments of a tape cassette according to the present invention in which the tape transport speed is greater than that in a conventional tape cassette.

FIG. 5 shows a fourth embodiment of a tape cassette according to the present invention in which a drive capstan 180 of a cassette player in use contacts an idler wheel 182 mounted on an arm 184, the latter providing a lift-off mechanism to clear the erase head of the cassette player. The idler wheel 182 is also engaged by a pressure roller 186 of the cassette player, the recording tape (referenced 188) being pinched between the idler wheel 182 and a pinch wheel 190. The pinch wheel 190 in turn engages a slipping clutch 192 which contacts a rim of the tape spool 193 to drive the latter, the slipping clutch 192 being mounted on a pivotal lever 194 with a guide wheel 196 around which the tape 188 passes. Using this arrangement, the tape transport speed can be reduced to about one quarter of that of a standard cassette. A further reduction in speed can be achieved by providing the idler wheel 182 with a reduced diameter portion and the pinch wheel 190 with an enlarged diameter portion, and by pinching the tape between these portions.

A fifth embodiment of a tape cassette according to the present invention is shown in FIG. 5 and is generally similar to that described above with reference to FIG. 2, similar parts being accorded the same reference numerals but with 200 added. However, the idler roller 232' now engages a reduced diameter portion of the further roller 236 so that the recording tape 216 (which is pinched between the roller 236 and the roller 238) is transported at a greater speed than in a standard cassette, rather than at a lower speed as in the case of the arrangement shown in FIG. 2.

Figure 7:
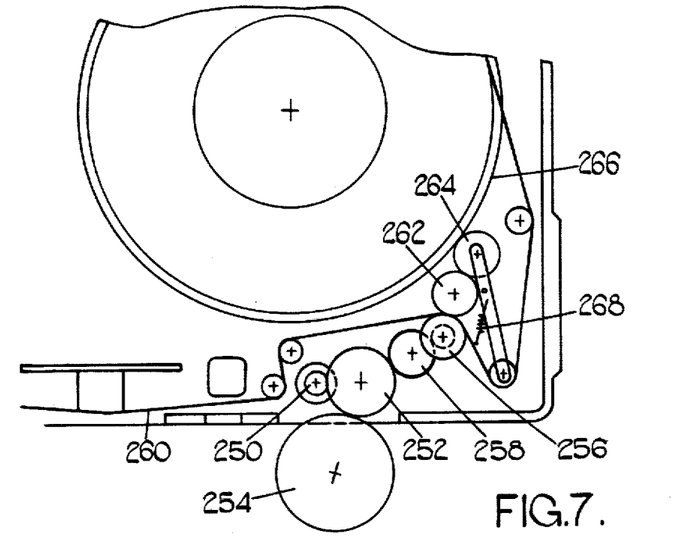

FIG. 7 illustrates a sixth embodiment of a tape cassette according to the present invention in which the tape is again transported at a greater speed than in a standard cassette. The capstan (referenced 250) of a cassette player drives an idler wheel 252 which is also engaged with the pressure roller (referenced 254) of the cassette player. The idler wheel 252 in turn drives an idler wheel 256 via a further idler wheel 258, the latter engaging a reduced diameter portion of the idler wheel 256. The recording tape (referenced 260) is pinched between the idler wheel 256 and a wheel 262, the latter also engaging a slipping clutch 264 which provides a rim drive for the tape spool (referenced 266). A spring 268 biases the clutch 264 into engagement with the tape spool rim, and also urges the wheels into engagement.

Figure 8:
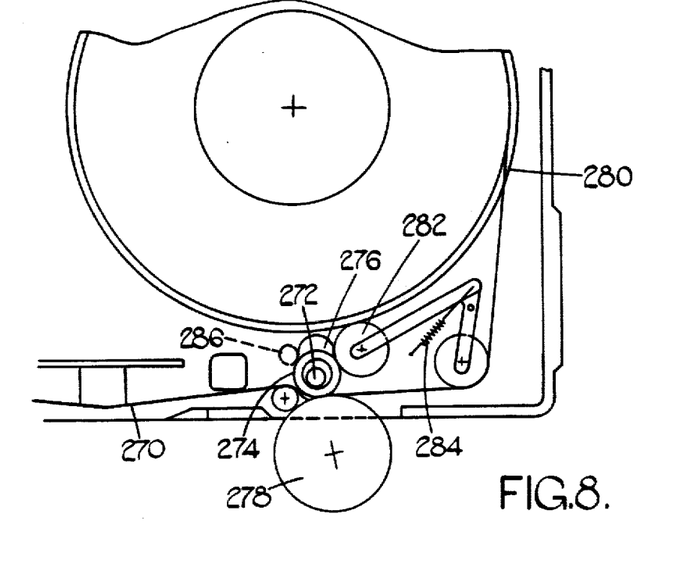

FIG. 8 depicts a seventh embodiment of a tape cassette according to the present invention, in which the recording tape (referenced 270) is driven by the capstan (referenced 272) of a cassette player via a floating sleeve 274 which is guided and retained in a locating recess 276. The tape is pinched between the floating sleeve 274 and the pressure roller (referenced 278) of the cassette player, drive also being transmitted from the floating sleeve 274 to the rim of the tape spool (referenced 280) by means of a slipping clutch 282, which is maintained in engagement with the spool rim by a tension spring 284. By means of this arrangement, the tape transport speed can be increased to about double that for a standard cassette.

In a modification (not shown) of the last-mentioned embodiment, drive is transmitted from the floating sleeve 274 to the slipping clutch 282 not by direct engagement of these parts but instead by a drive band which passes around the floating sleeve and an idler roller engaged with the slipping clutch. In addition, a retaining idler (shown in broken line at 286 in FIG. 8) can be provided for retaining the floating sleeve 274 in the desired position.

Figure 9:
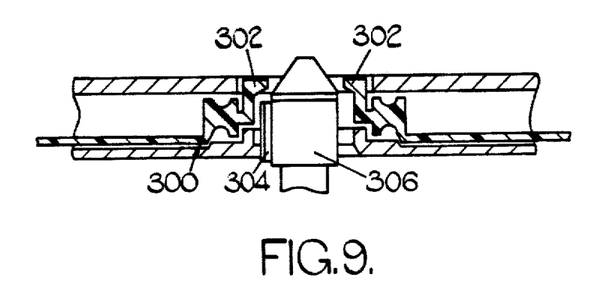
FIG. 9 is a sectional side view of a tape spool which can be used in any one of the cassettes shown in FIGS. 2 to 8.

In the above-described embodiments, it is assumed that the speed at which the tape spool is driven must be changed from the standard speed when the tape transport speed is increased or decreased from normal, and to this end the usual hub drive for the tape spool is replaced by a rim drive provided by a slipping clutch. The hub drive should, however, be retained when the cassette is inverted for tape to be wound onto the spool in the forward direction. FIG. 9 shows one form of tape spool 300 for use in a cassette according to the invention which allows this to happen. As in a conventional tape spool, the spool 300 has lugs 302 thereon which are engageable by axial splines 304 on a drive spindle 306 of a cassette player. However, the lugs 302 are disposed at one axial end of the spool, rather than centrally thereof as in a conventional cassette, so that they clear the ends of the splines 304 in one position of the cassette (as illustrated) and engage the splines when the cassette is inverted.

Figure 10:
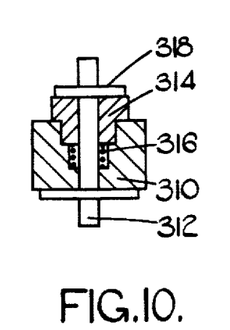
FIGS. 10 to 12 are sectional views of three different forms of slipping clutch which can be used in any one of the cassettes shown in FIGS. 2 to 8, FIGS. 10 and 11 being sectional views and FIG. 12 being a sectional plan view.
Figure 11:
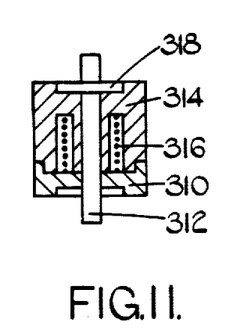
Figure 12:
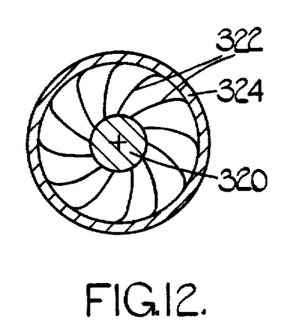

FIGS. 10, 11 and 12 illustrate three different forms of slipping clutch for use in the above-described embodiments. Each of the slipping clutches shown in FIGS. 10 and 11 has a driven wheel 310 which is bonded to a freely rotating spindle 312. A drive wheel 314 which is freely rotatable on the spindle 312 is biased by a spring 316 into frictional engagement with a flange 318 on the spindle 312. Drive is transmitted by this frictional engagement from the drive wheel 314 to the driven wheel 310 and thus to the tape spool rim. In FIG. 12, the slipping clutch comprises a drive wheel 320 having a plurality of flexible vanes 322 running axially thereof. Outer ends of these vanes contact an inner surface of an annular driven wheel 324 which is ffreely rotatable and engaged with the tape spool rim. By virtue of the frictional engagement of the vanes 322 with the driven wheel 324, the driven wheel rotates with the drive wheel 320 and thus transmits drive from the drive wheel to the tape spool rim.

Figure 13:
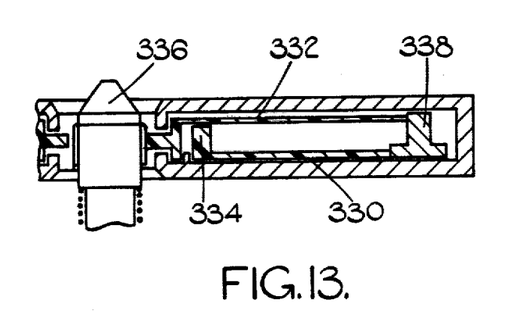
FIG. 13 is a sectional side view of an alternative form of tape spool which can be used in any one of the cassettes shown in FIGS. 2 to 8.

FIG. 13 illustrates an alternative arrangement for modifying the speed of the tape spool which does not require the use of a slipping clutch rim drive. In this arrangement, the tape spool is split into two axially spaced portions 330 and 332, the tape being wound around an upstanding annular flange 334 of the portion 330 whereas the portion 332 is drivingly engaged with a drive spindle 336 of a cassette player. Radially outer edges of the portions 330 and 332 have teeth which mesh with respective differing portions of a gear wheel 338. As shown, the portion 332 of the tape spool engages a smaller diameter portion of the gear wheel 338 so that the tape is unwound from the portion 330 at a higher rotational speed than the drive spindle 336. The arrangement can, however, be modified so that the portion 330 rotates at a lower speed than the drive spindle 336 by engaging the portion 332 with a larger diameter portion of the gear wheel 338.

Figure 14:
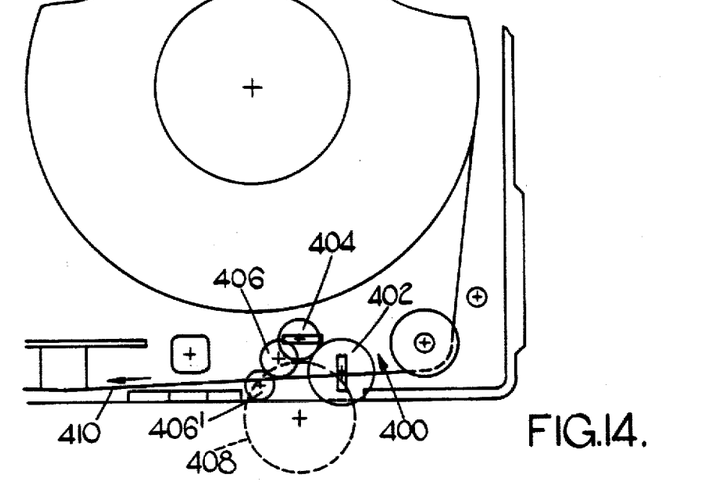
FIGS. 14 to 18 are schematic plan views of five further embodiments of a tape cassette according to the present invention in which the tape transport speed is less than that in a conventional cassette.

An eighth embodiment of a tape cassette according to the present invention is shown in FIG. 14, and has a tape drive system 400 which comprises two idler rollers 402 and 404 mounted in sliding tracks so that they can move in mutually perpendicular directions. As in conventional cassettes a hole 406 is provided in the cassette to allow entry of the capstan (not shown) of a cassette player. In operation, the capstan of the cassette player directly drives the roller 404 which in turn drives the roller 402. The capstan is maintained in abutment with the roller 404 by means of a fixed retaining wheel 406, the latter also preventing the pressure roller (shown in broken line at 408) of the cassette player coming into direct contact with the capstan and ensuring that the pressure roler 408 acts only on the roller 402. The recording tape (referenced 410) is driven between the pressure roller 408 and the roller 402. The rollers 402 and 404 can be spring biased into their rest positions to ensure good contact with one another and with the capstan.

Figure 15:
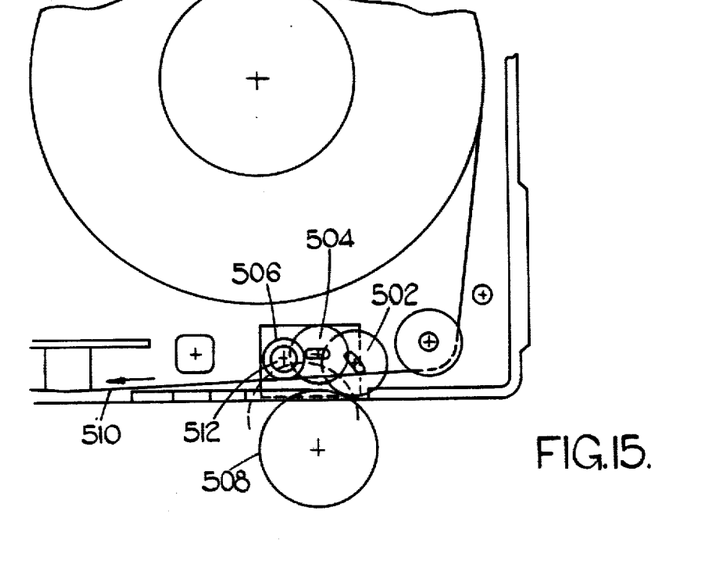

FIG. 15 illustrates a ninth embodiment of a tape cassette according to the present invention which is generally similar to the arrangement shown in FIG. 14, similar parts therefore being accorded the same reference numerals but with 500 added. In the embodiment of FIG. 15, however, the two rollers 502 and 504 are mounted for sliding movement at an angle to one another. The roller 504 is driven by the capstan (referenced 512) of the cassette player and has a reduced diameter portion with which the roller 502 is engaged. As in the previous embodiment, the recording tape 510 passes between the roller 502 and the pressure roller 508 of the cassette player. A retaining spring (not shown) is provided to maintain the rollers 502 and 504 in contact.

Figure 16:
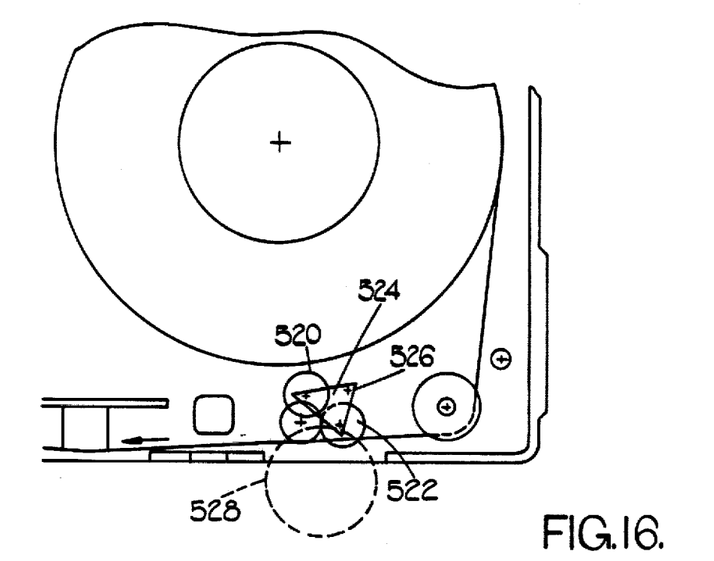

A tenth embodiment of a tape cassette according to the present invention is shown in FIG. 16, in which two mutually engaged idler rollers 520 and 522 are mounted on a triangular plate 524 which is pivotable about an axis 526. In use, the pressure roller (shown in broken line at 528) of a cassette player pinches the tape against the roller 522, drive being transmitted from the capstan (not shown) of the cassette player to the roller 522 by way of the roller 520. The rollers 520 and 522 are shown in their rest position in the absence of the capstan: when the capstan is present, it pivots the roller 520 about the pivot axis 526 and thereby moves the roller 522 into contact with the pressure roller 528.

Figure 17:
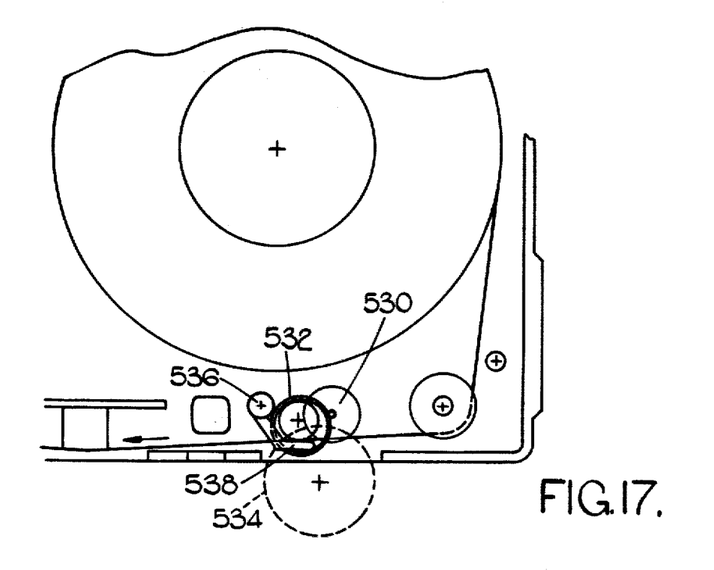

FIG. 17 shows an eleventh embodiment of the tape cassette according to the present invention, in which a drive system for the recording tape comprises a gear wheel 530 having a reduced diameter central portion (not shown) with which a sleeve 532 is engaged. In use, the capstan of a cassette player is received within the sleeve 532 and drives the gear wheel 530, the latter in turn driving the sleeve 532. The tape is pinched between the sleeve 532 and the pressure roller (shown in broken line at 534) of the cassette player. A retaining wheel 536 assists in maintaining the sleeve 532 in position and a retaining arm 538 prevents the roller 534 from coming into contact with the gear wheel 530, or forcing the sleeve 532 into contact with the capstan.

In each of the embodiments of FIGS. 14 to 17, the tape is transported at a slower speed than in a conventional cassette. If desired, the hub drive to the tape spool can be replaced by a slipping clutch rim drive, as in the embodiments of FIGS. 2 to 8. If, however, such a rim drive is not provided, it is possible to modify a conventional tape cassette into any one of the forms shown in FIGS. 14 to 17 merely by cutting away a portion of cassette which contains the hole through which the capstan enters and by replacing the cut-away portion with a preassembled unit containing the tape drive system.

Figure 18:
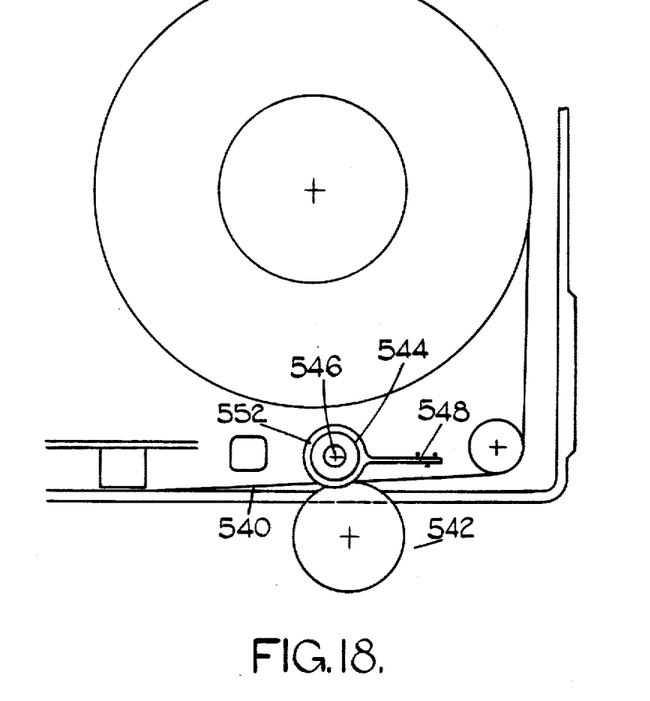
Figure 19:
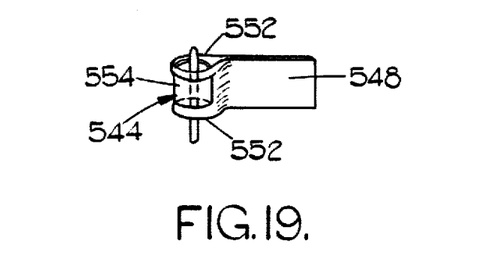
FIG. 19 is a perspective view of a spring and a sleeve which form part of the cassette shown in FIG. 18.
Figure 20:
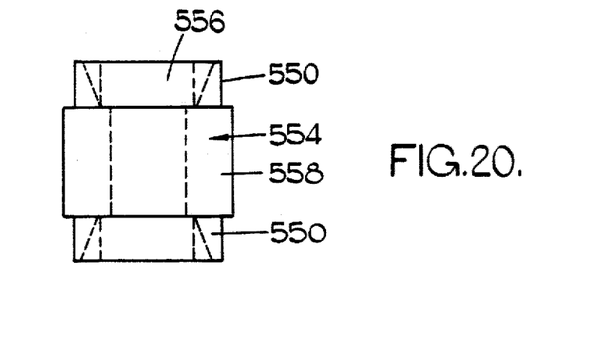
FIG. 20 is a side view of the above-mentioned sleeve.

FIGS. 18 to 20 show a twelfth embodiment of a tape cassette according to the present invention in which the tape transport speed is less than that for a standard cassette. The recording tape (referenced 540) is pinched in use between the pressure roller 542 of a cassette player and a sleeve 544 in which the capstan 546 of the cassette player is received, the sleeve 544 being mounted resiliently within the cassette by a spring 548. The sleeve 544 has two reduced diameter portions 550 adjacent its ends, and the spring 548 has two loops 552 which are spaced apart axially of the sleeve 544 and which rotatably receive the portions 550 respectively. The axial gap between the loops 552 provides sufficient clearance for the recording tape 540 and the pressure roller 542 to engage a central portion 554 of the sleeve. Preferably, the sleeve is constructed from a tubular nylon spigot 556 to the external surface of which a rubber ring 558 is adhered, the rubber ring forming the central portion 554 of the sleeve. The sleeve is shown in detail in FIG. 20.

Figure 21:
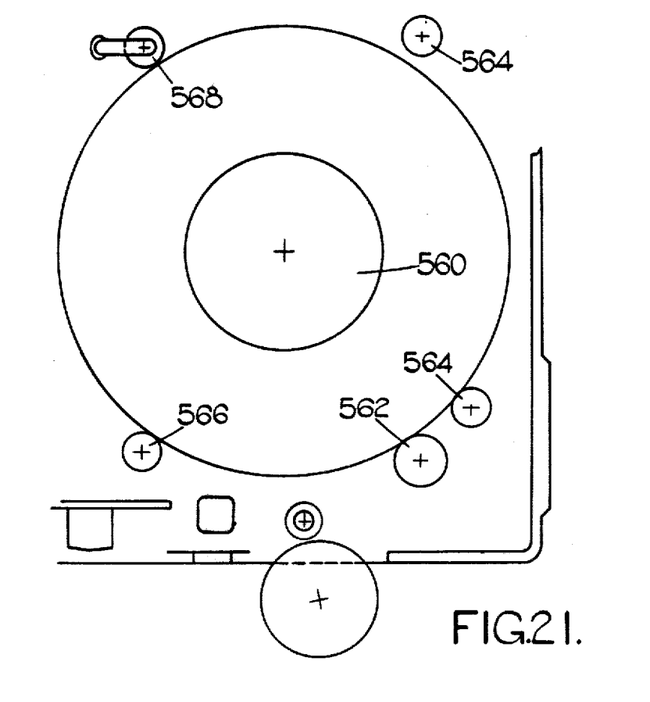
FIG. 21 is a schematic plan view of a drive slip arrangement for a tape spool which can be used in any one of the cassettes shown in FIGS. 2 to 8 and FIGS. 14 to 18.

FIG. 21 illustrates a drive slip arrangement for a tape spool which can be applied to any of the embodiments described above. The tape spool (referenced 560) is driven on its rim by a driver 562 which may be a slipping clutch drive. Two retaining rollers 564, one of which normally contacts the spool rim, are provided together with a pivot roller 566 which also normally contacts the spool rim. The spool is driven in an anticlockwise direction, and increase of the tension in the recording tape (not shown) beyond a certain level causes the spool to ride up on the pivot roller 566 and clear the driver 562. With the spool drive thus removed, the tension in the tape drops and the spool returns to its initial position in which it once again contacts the driver 562. A spring biased roller 568 in abutment with the spool rim prevents the spool from being displaced by too great an extent.

Finally, it will be appreciated that the tape speed past a tape head may be at any desired value depending primarily on the dimensions of the rollers in the tape drive system.

I claim:

1. A tape cassette for use in a cassette-type magnetic tape recorder of the type having a drive capstan and an erase head, said cassette comprising a casing, a pair of tape spools rotatably mounted in said casing and having a magnetic recording tape wound thereon, means in said casing for guiding said magnetic recording tape in a path extending adjacent one side edge of said casing, two drive capstan holes formed in said casing adjacent said side edge and located symmetrically about a midpoint of said edge whereby engagement of said cassette in a tape recorder locates the drive capstan of the tape recorder in one of said capstan holes for enabling the drive capstan to drive said tape in a first direction along said path from one of said spools to the other and inversion of said cassette locates the drive capstan in the other of said capstan holes for enabling the drive capstan in the other of said capstan holes for enabling the drive capstan to drive said tape in a second and reverse direction along said path, respective opening means in said one side edge adjacent each said drive capstan hole for engagement therein of the erasehead of the tape recorder, and a respective drive system located in said casing adjacent each of said drive capstan holes in engagement with said tape for transmitting drive from the drive capstan to said tape to drive said tape at a speed which is higher or lower than the speed at which said tape would be driven by the drive capstan alone and wherein each drive system is adapted to enable engagement of the erase head into the adjacent opening means in said one side edge.

2. A tape cassette according to claim 1 wherein each drive system is adapted to yield inwardly of said casing when contacted by the erase head in response to engagement of the erase head into said respective opening means in said one side edge.

3. The tape cassette according to claim 2, wherein said internal drive system comprises a plurality of rotatable members in said casing, a drive band passing around said plurality of rotatable members and engageable by the drive capstan of said tape cassette machine, said recording tape being driven by means of one of said plurality of rotatable members.

4. The tape cassette according to claim 3, wherein a further rotatable member in said casing is drivingly engaged by said one of said rotatable members, and said recording tape is frictionally engaged with said further rotatable member.

5. The tape cassette according to claim 4, wherein said further rotatable member has a first portion which is engaged by said one of said rotatable members and a second portion which is engaged by said recording tape, said first and second portions being of different diameters.

6. The tape cassette according to claim 3, wherein said recording tape is frictionally engaged with said one of said rotatable members.

7. The tape cassette according to claim 6, wherein said one of said rotatable members has a first portion which is engaged by said drive band and a second portion which is engaged by said recording tape, said first and second portions being of different diameters.

8. The tape cassette according to claim 2, wherein said internal drive system comprises a rotatable member which is engageable by the drive capstan of said tape cassette machine, said recording tape being driven by means of said rotatable member.

9. The tape cassette according to claim 8, wherein said rotatable member is a roller having an external surface which is engageable by the drive capstan of said tape cassette machine.

10. The tape cassette according to claim 8, wherein a train of at least one further rotatable member is drivingly engaged by said rotatable member, said recording tape being frictionally engaged with one of said further rotatable members in said train.

11. The tape cassette according to claim 8, wherein said rotatable member is biased towards a position in which it is engageable by the drive capstan of said tape cassette machine.

12. The tape cassette according to claim 2, further comprising means operative to rotate one of said spools at a different speed from that at which it would otherwise be rotated by a drive spindle of said tape cassette machine.

13. The tape cassette according to claim 12, wherein said means is in the form of a drive which is engaged with a rim of said one of the spools and which is driven by said internal drive system.

14. The tape cassette according to claim 13, wherein said drive includes a slipping clutch.

15. The tape cassette according to claim 12, wherein each said spool includes lugs which are engageable by the drive spindle of said tape cassette machine, said lugs being provided adjacent one axial end of said spool.

16. The tape cassette according to claim 12, wherein each said spool comprises a first part which is engaged by the drive spindle in use for rotation therewith and a second part around which said recording tape is wound, and said means is arranged to rotate said second part of said spool at a different speed from said first part.

17. The tape cassette according to claim 16, wherein said means is a gear wheel having two portions of different diameters which are engaged respectively with said first and second parts of said spool.

18. A tape cassette according to claim 1 wherein each drive system has cooperating means for enabling engagement of said erase head with said tape and preventing engagement of a pressure roller of the tape recorder with said tape.

19. The tape cassette according to claim 18 wherein said cooperating means comprises a respective plate-like member pivotably mounted in each said opening means.

20. A tape cassette comprising a casing, a pair of spools rotatably mounted in said casing and having a recording tape wound thereon, and an internal drive system contained within said casing and engaged with said recording tape, said internal drive system being engageable by a drive capstan of a tape cassette machine and driving said recording tape at a speed which is higher or lower than the speed at which said recording tape would be driven by the drive capstan alone, wherein said internal drive system including a rotatable member which is engageable by the drive capstan of said tape cassette machine, said recording tape being driven by means of said rotatable member, said rotatable member having an external surface and being rotatable about a first rotation axis, a further rotatable member rotatable about a second rotation axis having an external surface engaged with said external surface of said rotatable member, said recording tape being frictionally engaged with said further rotatable member, and said rotatable members being slidable transversely of said first and second rotation axes in mutually transverse directions.

21. A tape cassette comprising a casing, a pair of spools rotatably mounted in said casing and having a recording tape wound thereon, and an internal drive system contained within said casing and engaged with said recording tape, said internal drive system being engageable by a drive capstan of a tape cassette machine and driving said recording tape at a speed which is higher or lower than the speed at which said recording tape would be driven by the drive capstan alone, said internal drive system including a rotatable member which is engageable by the drive capstan of said tape cassette machine, said recording tape being driven by means of said rotatable member, said rotatable member having an external surface and being rotatable about a first rotation axis, a further rotatable member rotatable about a second rotation axis having an external surface engaged with said external surface of said rotatable member, said recording tape being frictionally engaged with said further rotatable member, and said rotatable members being angularly movable in unison about a common pivot axis which is parallel to said first and second rotation axes and spaced therefrom.

22. A tape cassette comprising a casing, a pair of spools rotatably mounted in said casing and having a recording tape wound thereon, and an internal drive system contained within said casing and engaged with said recording tape, said internal drive system being engageable by a drive capstan of a tape cassette machine and driving said recording tape at a speed which is higher or lower than the speed at which said recording tape would be driven by the drive capstan alone, wherein said internal drive system including a rotatable member which is engageable by the drive capstan of said tape cassette machine, said recording tape being driven by means of said rotatable member, said rotatable member having an external surface and being rotatable about a first rotation axis, a further rotatable member rotatable about a second rotation axis having an external surface engaged with said external surface of said rotatable member, said recording tape being frictionally engaged with said further rotatable member, and said rotatable members being slidable transversely of said first and second rotation axes in mutually transverse directions, said rotatable member being a sleeve having an internal surface and an external surface, said internal surface being engageable by the drive capstan of said tape cassette machine, said recording tape being driven by means of said external surface of said sleeve.

23. The tape cassette according to claim 22, wherein said recording tape is frictionally engaged with said external surface of said sleeve.

24. The tape cassette according to claim 23, further comprising a spring having two portions and wherein said sleeve has two axially spaced parts which are respectively rotatably mounted on said two portions of said spring, and said recording tape is engaged with a portion of said sleeve between said portions of said spring.

25. A tape cassette comprising a casing, a pair of spools rotatably mounted in said casing and having a recording tape wound thereon, and an internal drive system contained within said casing and engaged with said recording tape, said internal drive system being engageable by a drive capstan of a tape cassette machine and driving said recording tape at a speed which is higher or lower than the speed at which said recording tape would be driven by the drive capstan alone, wherein said internal drive system including a rotatable member which is engageable by the drive capstan of said tape cassette machine, said recording tape being driven by means of said rotatable member, said rotatable member having an external surface and being rotatable about a first rotation axis, a further rotatable member rotatable about a second rotation axis having an external surface engaged with said external surface of said rotatable member, said recording tape being frictionally engaged with said further rotatable member, and said rotatable members being slidable transversely of said first and second rotation axes in mutually transverse directions, said rotatable member being a gear having a first portion engageable by the drive capstan of said tape cassette machine and a second portion which is of different diameter from said first portion, a rotatable sleeve engaging said second portion of said gear, said recording tape being frictionally engaged with an external surface of said sleeve, and the drive capstan being receivable within said sleeve with clearance.

* * * * *